United States Patent
Lahbabi et al.

(10) Patent No.: US 10,778,491 B2
(45) Date of Patent: Sep. 15, 2020

(54) METHOD FOR PRODUCING A MULTI-CARRIER SIGNAL, DEVICE, AND CORRESPONDING COMPUTER PROGRAM

(71) Applicant: ORANGE, Paris (FR)

(72) Inventors: Naila Lahbabi, Chatillon (FR); Hao Lin, Chatillon (FR); Charbel Abdel Nour, Chatillon (FR); Catherine Douillard, Chatillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/341,642

(22) PCT Filed: Oct. 16, 2017

(86) PCT No.: PCT/FR2017/052836
§ 371 (c)(1),
(2) Date: Apr. 12, 2019

(87) PCT Pub. No.: WO2018/069661
PCT Pub. Date: Apr. 19, 2018

(65) Prior Publication Data
US 2019/0386866 A1    Dec. 19, 2019

(30) Foreign Application Priority Data
Oct. 14, 2016    (FR) ..................... 16 59988

(51) Int. Cl.
*H04L 27/26*    (2006.01)
*H04L 1/00*    (2006.01)
(Continued)

(52) U.S. Cl.
CPC .......... *H04L 27/2627* (2013.01); *H04L 1/007* (2013.01); *H04L 1/0068* (2013.01);
(Continued)

(58) Field of Classification Search
CPC . H04L 1/0068; H04L 1/0069; H04L 27/2627; H04L 1/007; H04L 5/006; H04L 25/03821; H04L 27/2698; H03M 13/6362
See application file for complete search history.

(56) References Cited

U.S. PATENT DOCUMENTS

| | | | |
|---|---|---|---|
| 5,812,601 A * | 9/1998 | Schramm | H03M 13/256 375/262 |
| 2002/0146074 A1 | 10/2002 | Ariel et al. | |

(Continued)

OTHER PUBLICATIONS

International Search Report and Written Opinion dated Jan. 17, 2018 for corresponding International Application No. PCT/FR2017/052836, filed Oct. 16, 2017.

(Continued)

*Primary Examiner* — Sung S Ahn
(74) *Attorney, Agent, or Firm* — David D. Brush; Westman, Champlin & Koehler, P.A.

(57) ABSTRACT

A method for generating a multicarrier signal formed by a temporal succession of multicarrier symbols, implementing the following steps for generating at least one block of multicarrier symbols: coding a set of information elements delivering a set of coded elements; puncturing a first sub-set of coded elements of the set of coded elements, according to a first puncturing pattern, delivering a first sub-set of punctured coded elements; puncturing a second sub-set of coded elements of the set of coded elements, complementary to the first sub-set, according to a second puncturing pattern, delivering a second sub-set of punctured coded elements; mapping, onto at least one complex symbol, of the punctured coded elements of the first and second sub-sets of punctured coded elements; and generating the block of multicarrier symbols from said at least one complex symbol.

24 Claims, 5 Drawing Sheets

Figure 3:
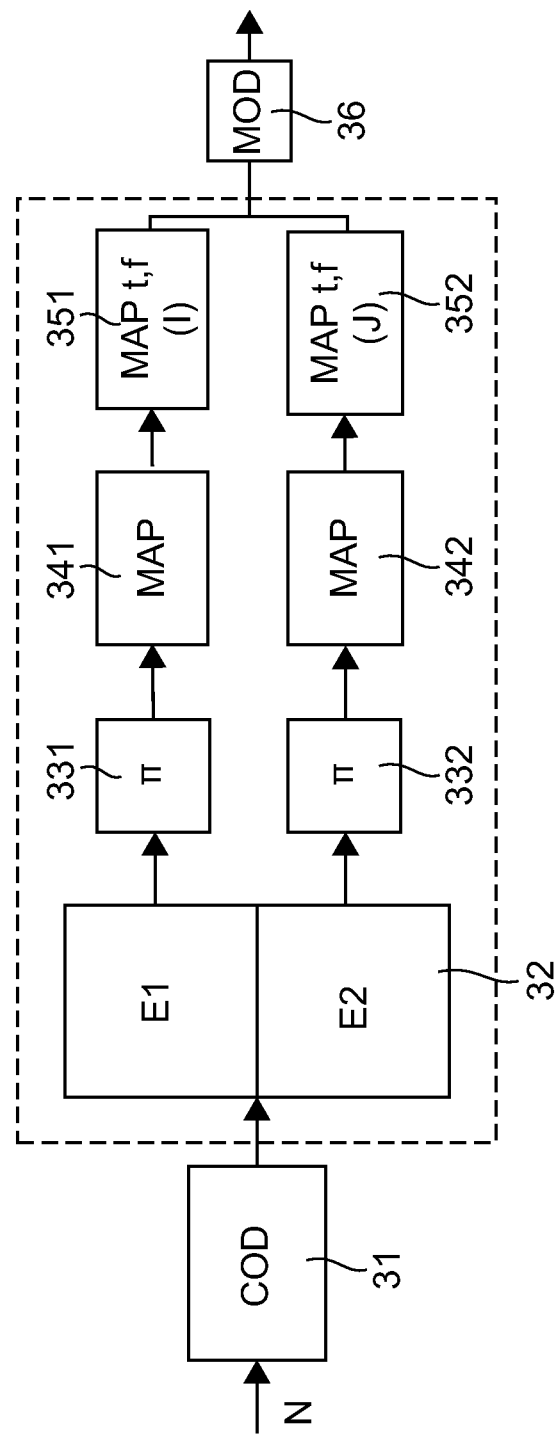

(51) Int. Cl.
    H04L 5/00      (2006.01)
    H04L 25/03     (2006.01)
(52) U.S. Cl.
    CPC ........ *H04L 5/006* (2013.01); *H04L 25/03821* (2013.01); *H04L 27/2698* (2013.01)

(56) References Cited

U.S. PATENT DOCUMENTS

| | | |
|---|---|---|
| 2010/0104044 A1 | 4/2010 | Kishigami et al. |
| 2012/0207223 A1 | 8/2012 | Xia et al. |
| 2013/0301550 A1* | 11/2013 | Kim ..................... H04W 72/02 370/329 |

OTHER PUBLICATIONS

French Search Report and Written Opinion dated Jun. 15, 2017 for corresponding French Application No. 1659988, filed Oct. 14, 2016.
Naila Lahbabi et al., "Sparse Interference Pre-Cancellation for FTN-OQAM Systems", Internet Citation, May 18, 2016 (May 18, 2016), pp. 1581-1585, XP002761336.
English translation of the International Written Opinion dated Jan. 17, 2018 for corresponding International Application No. PCT/FR2017/052836, filed Oct. 16, 2017.

* cited by examiner

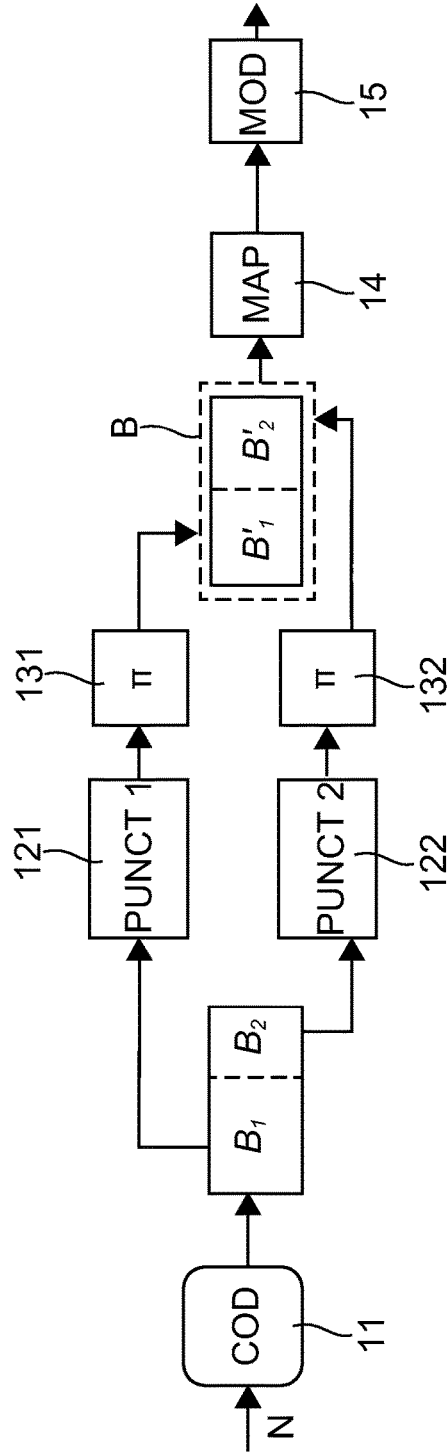
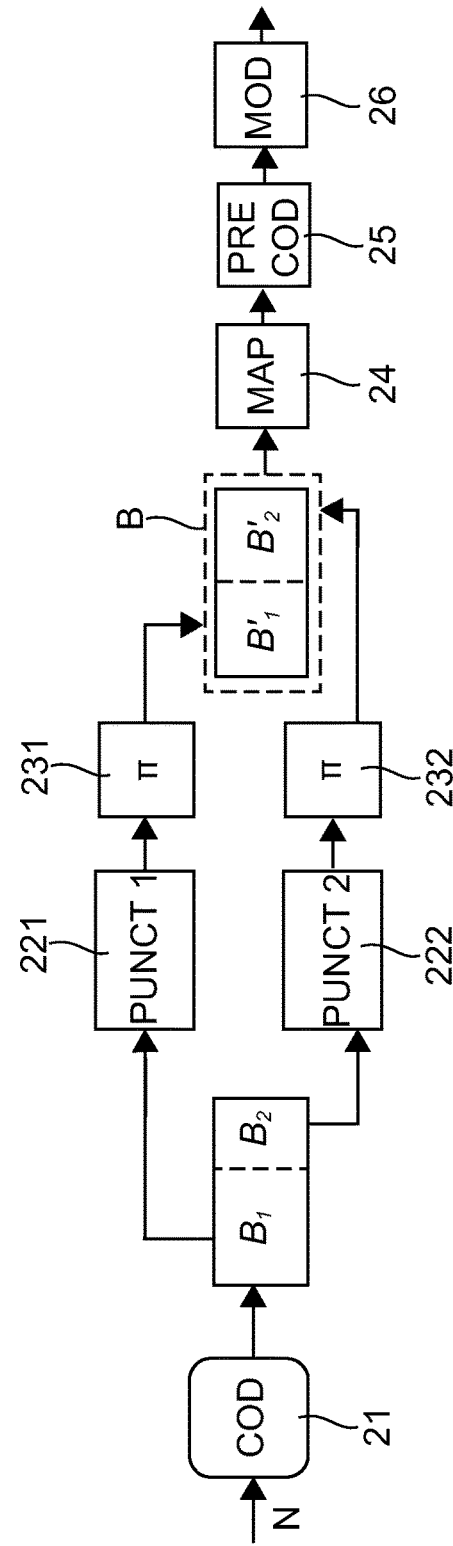

METHOD FOR PRODUCING A MULTI-CARRIER SIGNAL, DEVICE, AND CORRESPONDING COMPUTER PROGRAM

CROSS-REFERENCE TO RELATED APPLICATIONS

This Application is a Section 371 National Stage Application of International Application No. PCT/FR2017/052836, filed Oct. 16, 2017, which is incorporated by reference in its entirety and published as WO 2018-069661 A1 on Apr. 19, 2018, not in English.

FIELD OF THE INVENTION

The field of the invention is that of communications implementing a multicarrier modulation, for example of the OFDM, OFDM/OQAM, BFDM/OQAM and other types.

More specifically, the invention proposes a technique of modulation to optimize the transmission of certain data in reducing for example interference that affects this data.

In one particular embodiment, the invention offers a solution for "Faster-than-Nyquist" (FTN) data transmission.

The invention can be applied especially in the field of wireless communications (DAB, DVB-T, WLAN, unguided optical transmission etc.) or wire transmission (xDSL, PLC, optical and other forms of transmission). For example, the invention can be applied in the field of cell communications on uplink or downlink communications channels, Device-to-Device (D2D) communications, or communications using backhauling networks.

PRIOR ART

Multicarrier transmission techniques have numerous advantages, especially in the context of multipath channels. Thus, OFDM type modulations are especially well suited to countering the effects of fading in the frequency-selective channels.

However, these OFDM modulations have the drawback of generating multicarrier signals with poor frequency localization and therefore require the introduction of a guard interval in the time domain to limit interference. Now, the insertion of such a guard interval reduces the spectral efficiency of the multicarrier signal.

Alternative solutions have been proposed to limit interference while at the same time removing the need to insert a guard interval. These techniques rely on signal shaping using filters (for a discretized signal) or functions (for a continuous signal), called prototype functions enabling better frequency localization through properties of orthogonality restricted to the real domain. These are for example OFDM/OQAM or BFDM/OQAM type modulations.

Besides, in order to reduce the transmission time for a given volume of information or, in other words, to increase the volume of information for a given transmission time, there are also known ways of using an FTN transmission for OFDM or OFDM/OQAM type transmission systems.

However, FTN transmission generates high interference and therefore requires the complex processing operations at reception in order to rebuild the data transmitted.

There is therefore a need for a novel technique of multicarrier transmission that limits interference between carriers and/or between multicarrier symbols.

SUMMARY OF THE INVENTION

The invention proposes a novel solution that does not have all the drawbacks of the prior art, in the form of a method for generating a multicarrier signal formed by a temporal succession of multicarrier symbols.

According to the invention, such a method implements the following steps for the generation of at least one block of multicarrier symbols:

coding a set of information elements delivering a set of coded elements, puncturing a first sub-set of coded elements of the set of coded elements, according to a first puncturing pattern, delivering a first sub-set of punctured coded elements, puncturing a second sub-set of coded elements of the set of coded elements, complementary to the first sub-set, according to a second puncturing pattern, delivering a second sub-set of punctured coded elements, mapping, onto at least one complex symbol, of the punctured coded elements of the first and second sub-sets of punctured coded elements, generating the block of multicarrier symbols from said at least one complex symbol.

The invention thus proposes a novel solution for the generation of a multicarrier signal enabling the multicarrier symbols to be built in an ingenious way.

In particular, the invention proposes to implement a puncturing on the sub-sets of coded elements according to a first and second puncturing pattern enabling a desired efficiency value to be achieved. For example, the first and second puncturing patterns, which may be distinct, enable the definition of a first coding efficiency $r_1$ for the first sub-set of punctured coded elements, and a second coding efficiency $r_2$ for the second sub-set of punctured coded elements. These first and second coding efficiency values can be identical or different.

It can thus be chosen to offer a different degree of protection to the coded elements of the first sub-set of coded elements and to the coded elements of the second sub-set of coded elements.

These first and second values of coding efficiency are defined so as to comply with an overall coding efficiency of the modulation sequence, denoted as r, such that B=N/r, with N being the number of information elements input at the coding step, and B being the number of punctured coded elements input at the step of mapping onto the complex symbols.

According to a first example, the coding efficiency $r_1$ associated with the coding and puncturing steps of the first sub-set of coded elements is greater than the coding efficiency $r_2$ associated with the coding and puncturing steps of the second sub-set of coded elements. It is therefore sought to obtain the utmost protection for the elements of the second sub-set of punctured coded elements used to build the complex symbols.

According to a second example, the coding efficiency $r_1$ is lower than the coding efficiency $r_2$. It is therefore sought to obtain increased protection for the elements of the first sub-set of punctured coded elements used to build the complex symbols.

According to a third example, the coding efficiency $r_1$ is equal to the coding efficiency $r_2$. A same degree of protection is offered to the elements of the first sub-set of punctured coded elements and to those of the second sub-set of punctured coded elements.

The B punctured coded elements are then mapped onto the complex symbols, and the complex symbols are mapped onto the carriers of the block of multicarrier symbols. It may be recalled that a multicarrier symbol is formed by a set of carriers at different frequencies at a given point in time, each carrier being modulated by the real part and/or imaginary part of a complex symbol.

It can be noted that the invention can be applied to multi-carrier modulation systems initially meeting either the condition of complex orthogonality (as in the case of OFDM) or the condition of real orthogonality (as in the case of OFDM/OQAM). The "complex symbols" can therefore especially be with zero imaginary part, i.e. of real type, and/or be with zero real part. In particular, in OFDM, a complex symbol is mapped onto a position in time and several positions in frequency to build an OFDM multicarrier symbol. In OFDM/OQAM, the real part of a complex symbol is mapped to one position in time and several positions in frequency, and the imaginary part is mapped to the next position in time and several positions in frequency to build two OFDM/OQAM multicarrier symbols. Classically, the time between two OFDM multicarrier symbols is twice as long as the time between two OFDM/OQAM multicarrier symbols. The set of multicarrier symbols obtained from the complex symbols forms a block of multicarrier symbols.

In particular, the multicarrier signal is formed by a temporal succession of multicarrier symbols intended for faster-than-Nyquist transmission.

The invention thus proposes to reduce the interference generated by an FTN transmission of the multicarrier signal.

In addition, FTN transmission in the form of a frequency multiplex procures the advantages of multicarrier systems, such as the flexibility of the modulator (for example the possibility of turning off certain carriers) or the use of efficient algorithms to implement the modem (for example algorithms based on Inverse Fast Fourier Transform (IFFT) or Fast Fourier Transform (FFT)).

The proposed solution thus offers a novel technique for generating (or building) a multicarrier signal enabling an increase of the transmission bit rate in a given frequency band, while reducing interference related to FTN transmission.

According to one particular embodiment, the method of generation according to the invention furthermore comprises a step for precoding a first sub-set of complex symbols, delivering a first sub-set of precoded complex symbols, said precoding step modifying the value of a complex symbol of said first sub-set of complex symbols to take account of interference generated by at least one other complex symbol intended for transmission at the same instant or at a same frequency according to a predetermined time-frequency transmission pattern.

According to this embodiment, the step for generating the block of multicarrier symbols modulates each carrier of said block by a complex precoded symbol of the first sub-set of complex symbols or by a complex non-precoded symbol of a second sub-set of complex symbols, according to said predetermined transmission pattern.

It is thus proposed to precode certain complex symbols before they are transmitted, by assigning a particular value to certain complex symbols according to their position after time-frequency mapping (i.e. their time-frequency position) in a pattern of transmission (i.e. in the block of multicarrier symbols to be transmitted) so that the symbol received at this position is not affected or little affected (i.e. disturbed) by interference. Hence, the interference likely to affect a complex symbol is at least partially pre-cancelled, depending on the transmission pattern used.

In particular, the first sub-set of complex symbols is generated from the punctured coded elements of the first sub-set of coded elements, and the second sub-set of complex symbols is generated from the punctured coded elements of the second sub-set of coded elements.

It is therefore possible, according to this embodiment, to offer a different degree of protection to the punctured coded elements of the first sub-set associated with complex symbols intended to be precoded, and to the punctured coded elements of the second sub-set associated with the complex symbols not intended to be precoded.

According to one particular characteristic, the method according to the invention further comprises a first step for interleaving the punctured coded elements of the first sub-set of punctured coded elements and a second step for interleaving the punctured coded elements of the second sub-set of punctured coded elements implemented prior to the mapping step.

In particular, if each sub-set of punctured coded elements comprises on the one hand information elements (systematic ones) and, on the other hand, redundancy elements obtained from these information elements, the first step of interleaving implements at least one first interleaving pattern for the interleaving of the information elements of the first sub-set of the punctured coded elements and a second interleaving pattern for the interleaving of the redundancy elements of the first sub-set of punctured coded elements, and the second step of interleaving implements at least one first interleaving pattern for the interleaving of the information elements of the second sub-set of punctured coded elements and a second interleaving pattern for the interleaving of the redundancy elements of the second sub-set of punctured coded elements.

The different interleavers used can be identical or different. For example, it is possible to use a same random interleaver for the interleaving of the information elements and for the interleaving of the redundancy elements for each sub-set of punctured coded elements.

According to one embodiment, the step for generating the block of multicarrier symbols takes account of at least one interference affecting at least one carrier of the multicarrier signal.

More specifically, the invention according to this embodiment optimizes the time-frequency mapping of the complex symbols onto the carriers of the block of multicarrier symbols in allocating, to certain complex symbols, positions that are less subject to interference (for example the complex symbols built out of information elements) and in allocating, to other complex symbols, positions more subject to interference (for example the complex symbols built out of redundancy elements).

In particular, the step for generating the block of multicarrier symbols implements the following sub-steps for at least one carrier of the block of multicarrier symbols:

determining a power of interference affecting the carrier on $N_\tau$ consecutive positions in time;

classification of the $N_\tau$ positions according to said power of interference;

time-frequency mapping of the complex symbols built out of information elements of the first sub-set of punctured coded elements to the positions associated with a power of interference smaller than or equal to a predetermined threshold, and complex symbols built out of redundancy elements of the first sub-set of punctured coded elements, obtained from these information elements, to positions associated with a power of interference greater than the predetermined threshold, and time-frequency mapping of the complex symbols built out of the information elements of the second sub-set of punctured coded elements to the positions associated with a power of interference smaller than or equal to a predetermined threshold and of complex symbols built out of redundancy elements of the second sub-set of punctured coded elements, obtained from the information elements, to the positions associated with a power of interference greater than the predetermined threshold.

According to this embodiment, it is thus possible to map the (systematic) information elements or more specifically the complex symbols obtained from these information elements onto the carriers at the positions of the frequency-time space least affected by interference.

In particular, the number of positions $N_\tau$ depends on the compression factor $\tau$ defined for transmission at a faster-than-Nyquist rate.

Thus, with $N_{mp}$ denoting the number of multicarrier symbols in a block, we have:

$$N_{mp} = a * N_\tau (a \in \mathbb{N}).$$

We also have, with N denoting the number of information elements at input of the coding step, M the number of carrier frequencies to be modulated, r an overall coding efficiency and $\mathrm{mod}_{ord}$ the order of the modulation:

$$N_{mp} = N/(r*M*\log_2(\mathrm{mod}_{ord})) \text{ if an OFDM type modulation is considered, or}$$

$$N_{mp} = 2*N/(r*M*\log_2(\mathrm{mod}_{ord})) \text{ if an OFDM/OQAM type modulation is considered.}$$

Indeed, if we take the context of an FTN transmission, it is noted that the interference introduced by the FTN transmission depends on the time instant n and is periodic. Its period $N_\tau$ depends on the compression factor $\tau$ in time (or $N_f$ for the discrete signal such that $$N_f = \left[ \tau \cdot \frac{M}{2} \right]_{rounded}).$$

It is therefore possible, once the interference is associated with $N_\tau$ temporal positions for different frequencies, to determine the classification of the positions according to the power of interference and then use this classification for the $N_\tau$ following positions, i.e. for the following period.

The invention also relates to a device for generating a corresponding multicarrier signal comprising:
- a coder coding a set of information elements delivering a set of coded elements,
- a first puncturing module for puncturing a first sub-set of coded elements of said set of coded elements according to a first puncturing pattern, delivering a first sub-set of punctured coded elements,
- a second puncturing module for puncturing a second sub-set of coded elements of said set of coded elements, complementary to said first sub-set, according to a second puncturing pattern, delivering a second sub-set of punctured coded elements,
- a mapping module for mapping the punctured coded elements of said first and second sub-set of punctured coded elements onto at least one complex symbol,
- a module for generating a block of multicarrier symbols from said at least one complex symbol.

Such a device for generating a multicarrier signal is especially adapted to implementing the method for generating described here above. It is for example a transmitter of a cell network base station for downlink communications or a transmitter of a computer, telephone, tablet, set-top box or other type of terminals for uplink communications. This device could of course comprise the different characteristics of the method of generation according to the invention that can be combined or taken in isolation. Thus the characteristics and advantages of this device are the same as those of the method described here above. They are therefore not described in more ample detail.

The invention also relates to one or more computer programs comprising instructions to implement a method for generating a multicarrier signal as described here above when this program or these programs are executed by at least one processor.

The invention also relates to an information carrier or medium readable by a computer and comprising instructions of a computer program as mentioned here above.

LIST OF FIGURES

Figure 4:
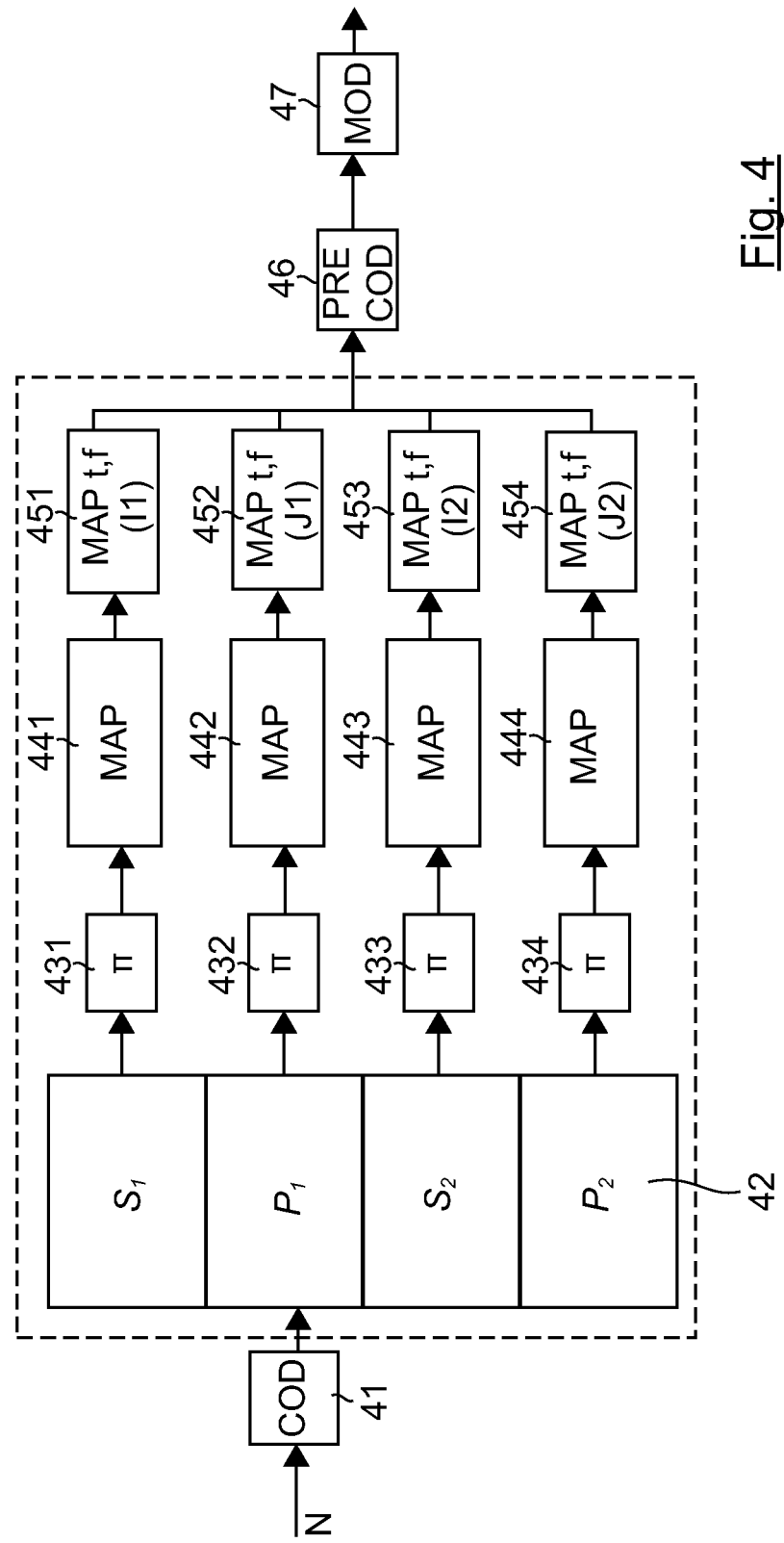
Figure 5:
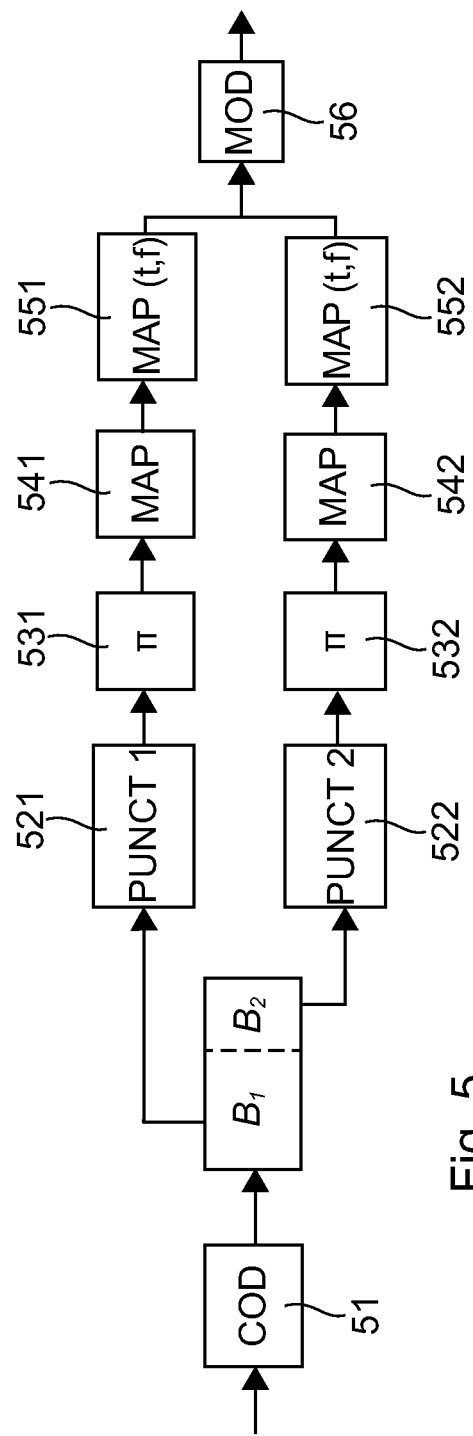
Figure 7:
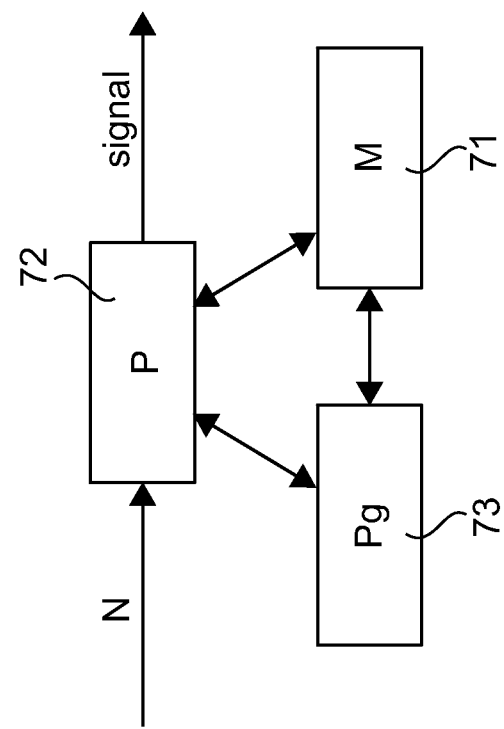
Figure 6:
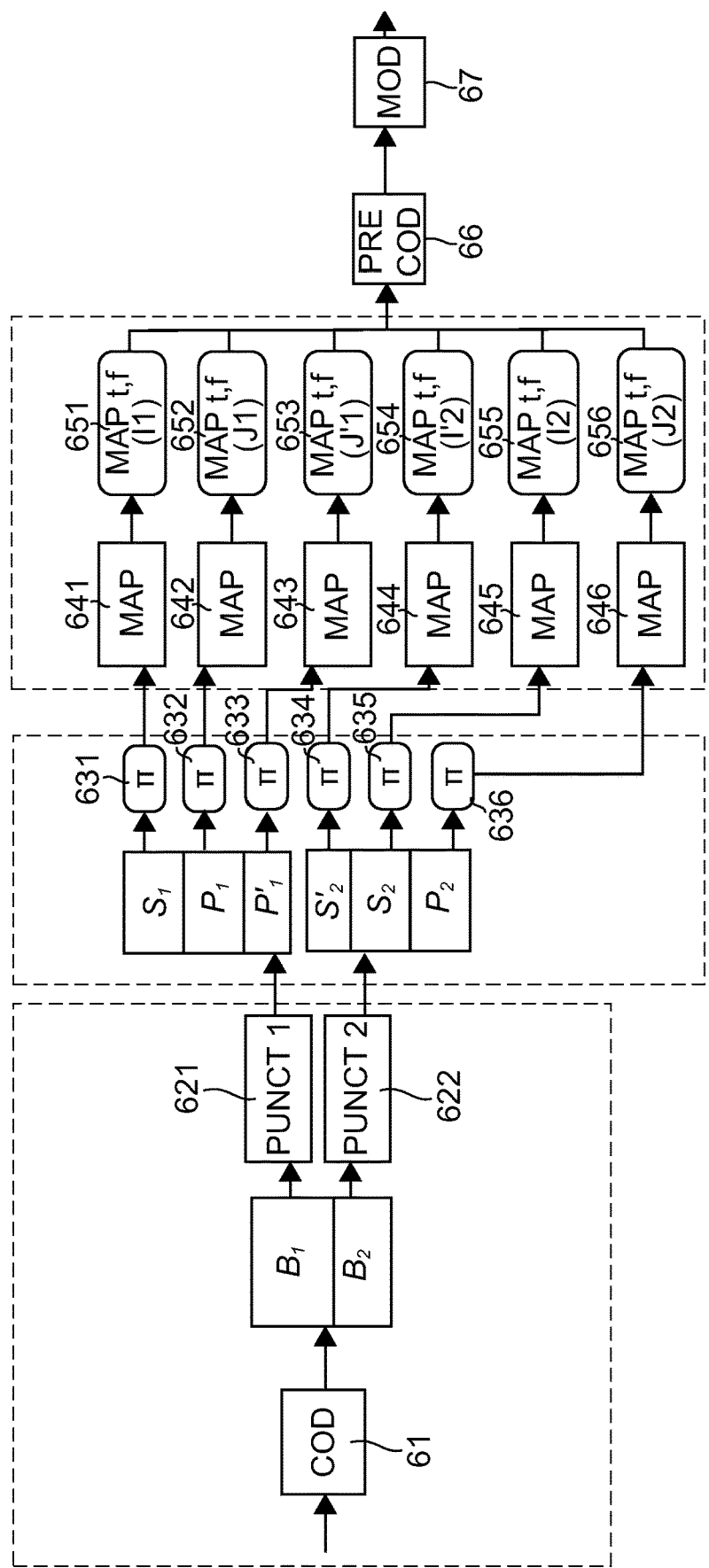

Other features and advantages of the invention shall appear more clearly from the following description of a particular embodiment, given by way of a simple illustratory and non-exhaustive example and from the appended drawings, of which:

FIGS. 1 and 2 illustrate the main steps implemented by a method for generating a multicarrier signal according to one particular embodiment of the invention, with or without precoding;

FIGS. 3 and 4 present a technique for optimizing the step of time-frequency mapping;

FIGS. 5 and 6 illustrate the main steps implemented by a method for generating a multicarrier signal according to one particular embodiment of the invention, implementing the technique for optimizing the step of time-frequency mapping with or without precoding;

FIG. 7 presents the simplified structure of a device implementing a technique for generating a multicarrier signal according to one embodiment of the invention.

DESCRIPTION OF ONE EMBODIMENT OF THE INVENTION

The general principle of the invention relies on the processing, separately, of two sub-sets of coded elements obtained by the coding of a set of information elements, this processing being separate up to the operation for mapping coded elements onto complex symbols.

In particular, separate processing such as this enables the implementing of a distinct puncturing on each sub-set of coded elements, making it possible to offer the different sub-sets different degrees of protection in terms of coding.

According to one embodiment, the invention also proposes to optimize the time-frequency mapping of complex symbols. According to one particular example of implementation, the proposed solution ensures that the complex symbols built out of information bits (systematic bits) are mapped onto carriers placed at the positions of the time-frequency space least affected by interference.

FIG. 1 illustrates the main steps implemented by a method for generating a multicarrier signal according to one embodiment of the invention.

According to this FIG. 1, for the generation of at least one block of multicarrier symbols, such a method implements a step 11 for coding a set of information elements, for example sized N, delivering a set of coded elements, for example sized B'.

Such a coding step applies for example a channel coding that may be of a systematic or non-systematic type. It enables for example the generation of (B'−N) redundancy elements from N information elements to compensate for the noise on the transmission channel. The efficiency r' of the coding step 11 is such that B'=N/r'.

If the number of coded elements used to form complex symbols (q-ary symbols) is fixed at B, a puncturing operation is implemented after the coding step 11 to ensure an overall coding efficiency r such that B=N/r.

Thus, letting M denote the number of carriers to be modulated and $mod_{ord}$ the modulation order, the number of multicarrier symbols in a block is:

$N_{mp}=N/(r*M*\log_2(mod_{ord}))$ if an OFDM modulation is considered, or $N_{mp}=2*N/(r*M*\log_2(mod_{ord}))$ if an OFDM/OQAM modulation is considered.

The invention proposes to apply a different efficiency to certain information elements so as to increase or reduce the level of protection of these information elements obtained through coding. Thus, it is sought to apply an efficiency $r_1$ to a first sub-set of information elements sized $N_1$, so as to obtain a first sub-set of punctured coded elements sized $B'_1$, and an efficiency $r_2$ to a second sub-set of information elements sized $N_2$, so as to obtain a second sub-set of punctured coded elements sized $B'_2$, with $N_1+N_2=N$ and $B=B'_1+B'_2$. To this end, it is possible to use different puncturing patterns for the first sub-set of coded elements and for the second sub-set of coded elements.

More specifically, a puncturing operation 121 is applied to a first sub-set of coded elements of the set of coded elements, sized $B_1$, obtained from the first sub-set of information elements sized $N_1$:$B_1=N_1/r'$. We thus obtain a first sub-set of $B'_1$ coded elements punctured according to a first puncturing pattern. The coding efficiency associated with the coding step 11 and puncturing step 121 is such that $B'_1=N_1/r_1$. During a following step 131, the $B'_1$ punctured coded elements of this first sub-set can be interleaved, for example by using a first random interleaving function.

A puncturing operation 122 is also applied to a second sub-set of coded elements of the set of coded elements, sized $B_2$, with $B_1+B_2=B'$, obtained from the second sub-set of information elements sized $N_2$:$B_2=N_2/r'$. A second sub-set of $B'_2$ punctured coded elements is thus obtained according to a second puncturing pattern that can be distinct from the first puncturing pattern. In particular, if $r_1 \neq r_2$, the first and second puncturing patterns are different. If $r_1=r_2$, the first and second puncturing patterns can be different or identical. The coding efficiency associated with the coding step 11 and puncturing step 122 is such that $B'_2=N_2/r_2$. During a following step 132, the $B'_2$ punctured coded elements of the second sub-set can be interleaved, for example by using a second random interleaving function which can be identical to or distinct from the first interleaving function.

At the end of these steps, namely the coding step 11, the puncturing steps 121 and 122, and possibly the interleaving steps 131 and 132, we obtain B punctured coded elements with $B=B'_1+B'_2$, and an overall efficiency $$r = \frac{r_1 B'_1}{B} + \frac{r_2 B'_2}{B}.$$

These B punctured coded elements are converted into at least one complex symbol during a mapping step 14 in using for example the Gray technique.

During a following step, a block of multicarrier symbols "to be transmitted" is generated from the complex symbols.

As indicated here above, we propose to apply a different efficiency to certain information elements so as to increase or reduce the level of protection of these information elements obtained through the coding. For example, if we choose $r_1 \leq r \leq r_2$, the first sub-set of information elements benefits from better protection (strong code) than the second sub-set of information elements (weak code). If we choose $r_2 \leq r \leq r_1$, the second sub-set of information elements benefits from a better protection (strong code) than the first sub-set of information elements (weak code). If we choose $r_1=r_2=r$, the elements of the first sub-set and of the second sub-set of information elements benefits from a similar protection.

By way of an example, the information elements are considered to be information bits.

If the size of the set of information bits input at the coding step 11 is N, if the coding step implements a mother code with an efficiency r'=¼, and if the size of the set of coded bits chosen to form the complex symbols is B=2*N, then the "overall" code efficiency considered (between the input of the coding step 11 and the input of the mapping step 14) is r=½.

We choose for example a first code efficiency $r_1=8/17$ to be applied to the first sub-set of information elements and a second code efficiency $r_2=9/17$ to be applied to the second sub-set of information elements.

If it is considered that half of the bits coded to form the complex symbols belong to the first sub-set of punctured coded elements, and that the other half of the bits coded to form the complex symbols belong to the second sub-set of punctured coded elements, i.e. =$B'_2$=B/2, then $N_1$ and $N_2$ can be defined as follows from $$B'_1 = \frac{N_1}{r_1} = \frac{B}{2} \text{ and } B'_2 = \frac{N_2}{r_2} = \frac{B}{2}:$$

$$N_1 = \frac{B \times r_1}{2} = 2 \times N \times \frac{r_1}{2} = N \times r_1 = \frac{8N}{17}$$

$$N_2 = \frac{B \times r_2}{2} = 2 \times N \times \frac{r_2}{2} = N \times r_2 = \frac{9N}{17}$$

At input to the coding step 11, we can therefore consider a first sub-set of $$N_1 = \frac{8N}{17}$$

information bits and a second sub-set of $$N_2 = \frac{9N}{17}$$

information bits.

At the end of the coding step 11, we obtain a first sub-set of $B_1$ coded bits, formed out of the $N_1$ information bits of the first sub-set and a second sub-set of $B_2$ coded bits formed out of the $N_2$ information bits of the second sub-set, such that:

$$B_1 = \frac{N_1}{r'} = \frac{8N}{17} \times 4 = \frac{32N}{17}$$

-continued $$B_2 = \frac{N_2}{r'} = \frac{9N}{7} \times 4 = \frac{36N}{17}$$

We thus obtain, at the end of the puncturing step 121 applied to the first sub-set of $B_1$ coded bits and after the interleaving step 131 if any, the first sub-set of punctured coded bits sized $B'_1=B/2$.

We also obtain, at the end of the puncturing step 122 applied to the second sub-set of $B_2$ coded bits and after the interleaving step 132 if any, the second sub-set of punctured coded bits sized $B'_2=B/2$.

For example, if we consider a systematic code with an overall efficiency $r=\frac{1}{2}$, first and second efficiency values such that $$r_1 = \frac{8}{17} \leq r = \frac{1}{2} \leq r_2 = \frac{9}{17},$$

and if only redundancy bits are punctured, then the sub-set of least punctured coded bits (i.e. $B'_1$) has more redundancy bits than systematic bits. The sub-set of most punctured coded bits (i.e. $B'_2$) has more systematic bits than redundancy bits.

If necessary, as illustrated in FIG. 2, a step of precoding of the complex symbols can be implemented between the mapping and modulation steps.

Thus, according to the embodiment illustrated in FIG. 2, it is possible to precode at least one complex symbol modulating a carrier of a multicarrier signal by modifying its value to take into account, at transmission, an inter-symbol interference ISI and/or inter-carrier interference $ICI_n$ normally affecting this complex symbol. The invention, according to this embodiment, thus proposes to at least partially pre-cancel an interference between multicarrier symbols and/or inter-carrier interference for at least one complex symbol.

Such a technique can especially be implemented for faster-than-Nyquist data transmission for an OFDM or OFDM/OQAM type modulation.

It is proposed, according to this embodiment, to at least partially pre-cancel the ISI and $ICI_n$ interferences at transmission, since they are known to the transmitter. Thus, instead of transmitting complex symbols $a_{m,n}$, it is possible to transmit precoded symbols $c_{m,n}$ such that:

$$c_{m,n}=a_{m,n}-\alpha ISI-\beta ICI_n$$

It is noted first of all that, for a complex symbol $a_{m,n}$, the complex symbols $a_{m,n+p}$ and $a_{m,n-p}$ take part in the ISIs, and the complex symbols $a_{m+q,n}$ and $a_{m-q,n}$ take part in the ICIs, with p, $q \in \Re^+$, $p \in [-l,l]$ and $q \in [-l',l']$. It is therefore not possible to precode all the complex symbols, i.e. pre-cancel the interference of all the complex symbols.

The values of l and l' can be determined from at least one element belonging to the group comprising: the length of the prototype filter used, the compression factor T and the type of modulation.

Thus, in order to limit the decrease in the power of the payload complex symbol $a_{m,n}$, two factors $\alpha$ and $\beta$ are introduced. This enables the selection of the type of interference that it is sought to cancel at least partially through the precoding. A first sub-set of precoded complex symbols $c_{m,n}=a_{m,n}-\alpha ISI-\beta ICI_n$ is transmitted on a first part of the frame. On the rest of the frame, a second sub-set of non-precoded complex symbols $a_{m,n}$ is transmitted.

This technique of pre-cancellation of at least part of interference can be called an SIPC (Sparse Interference Pre-Cancellation) precoding technique and is especially presented in the document "Sparse Interference Pre-Cancellation for FTN-OQAM Systems" (Naila Lahbabi et al., "22nd European Wireless Conference", 18-20 May 2016, Oulu, Finland).

According to FIG. 2, the coding step 21, puncturing step 221, puncturing step 222, interleaving step 231, interleaving step 232, and mapping step 24 are similar to the coding step 11, puncturing step 121, puncturing step 122, interleaving step 131, interleaving step 132 and mapping step 14.

The precoding step 25, for its part, precodes a first sub-set of complex symbols among the set of complex symbols obtained from the set of N information elements. We thus obtain a first sub-set of K precoded symbols. This precoding step 25 modifies the value of a complex symbol of the first sub-set to take account of an interference generated by at least one other complex symbol intended for transmission at the same instant or at a same frequency according to a predetermined pattern of time-frequency transmission.

The modulation step 26 then modulates the carriers of the multicarrier symbol or symbols either by a precoded complex symbol of the first sub-set of complex symbols or by a non-precoded complex symbol of a second sub-set of complex symbols, according to a predetermined transmission pattern.

In particular, according to this embodiment, the punctured coded elements used to build the complex symbols intended for precoding during the precoding step 25 belong to the first sub-set of punctured coded elements $B'_1$, and the punctured coded elements used to build the complex symbols not intended for precoding during the precoding step 25 belong to the second sub-set of punctured precoded elements $B'_2$.

For example it is desired that half of the complex symbols to be transmitted are precoded and the other half are not precoded. We thus propose, according to this embodiment, to use distinct code efficiency values on the one hand for the coding of the information elements that are to form the complex symbols intended for precoding and, on the other hand, for the coding of the information elements that are to form complex symbols intended for non-precoding. In other words, it is possible to define a code efficiency $r_1$ to be applied to the first sub-set of information elements, enabling the generation of the complex symbols intended to be precoded and a code efficiency $r_2$ to be applied to the second sub-set of information elements enabling the generation of the complex symbols not intended for precoding.

As described here above with FIG. 1, if $r_1 \leq r \leq r_2$ is chosen, then the first sub-set of information elements used to generate the precoded symbols benefits from a better protection (strong code) than the second sub-set of information elements used to generate the non-precoded symbols (weak code). If $r_2 \leq r \leq r_1$ is chosen, the second sub-set of information elements used to generate the non-precoded symbols benefits from a better protection (strong code) than the first sub-set of information elements used to generate the precoded symbols (weak code). If $r_1=r_2=r$ is chosen, the elements of the first sub-set and of the second sub-set of information elements benefit from a similar protection.

Referring now to FIG. 3, we present a variant that can be used to optimize the mapping of the complex symbols onto the carriers in the time-frequency space. Such a variant further improves the transmission of a multicarrier signal, in attenuating the interferences that affect certain symbols during the transmission of the multicarrier signal.

For the sake of simplification, we present first of all the implementation of such a technique for optimizing the mapping of the complex symbols onto the carriers not combined with the technique for generating a multicarrier signal described with reference to FIGS. 1 and 2.

According to this technique illustrated in FIG. 3, a step of coding 31 is applied to a set of information elements, for example sized N, delivering a set of coded elements, for example sized B.

Such a step of coding implements for example a channel coding which can be of a systematic or non-systematic type. It makes it possible for example to generate (B−N) redundancy elements from the N information elements to compensate for the noise on the transmission channel.

The coded elements are then separated (32) into two sub-sets: a first sub-set of coded elements, denoted as E1, and a second sub-set of coded elements, denoted as E2, and each sub-set is processed separately.

For example, if the coding step 31 implements a systematic code, the first sub-set of coded elements E1 can be formed by the N (systematic) information elements and the second sub-set of coded elements E2 by (B−N) redundancy elements obtained from the N information elements.

The coded elements of the first sub-set of coded elements E1 can then be interleaved during an optional interleaving step 331 and then converted into at least one complex symbol during a mapping step 341. The complex symbol or symbols thus obtained are then mapped onto the carriers of the multicarrier signal during a time-frequency mapping step 351. At least one multicarrier symbol is thus obtained.

Similarly, the coded elements of the second sub-set of coded elements E2 can then be interleaved during an optional interleaving step 332 and then converted into at least one complex symbol during a mapping step 342. The complex symbol or symbols thus obtained are then mapped onto the carriers of the multicarrier signal during a time-frequency mapping step 352. At least one multicarrier symbol is thus obtained.

During a modulation step 36, the multicarrier symbol or symbols thus built are transmitted.

If necessary, a step for precoding complex symbols can be implemented before the modulation step 36, for example according to the SIPC precoding technique introduced here above.

More specifically, according to the example illustrated in FIG. 3, a technique is proposed for choosing the position of the carrier "mapped" with a complex symbol during the time-frequency mapping step. Thus, the coded elements obtained at output of the coding step 31 are separated to allocate carriers subjected to a first type of interference (for example interference below a predetermined threshold) to the complex symbols obtained from the coded elements of the first sub-set of coded elements and carriers subjected to a second type of interference (for example interference greater than or equal to a predetermined threshold) to the complex symbols obtained from the coded elements of the second sub-set of coded elements.

For example, if the first sub-set of coded elements E1 comprises N (systematic) information elements and the second sub-set of coded elements E2 comprises (B−N) (parity) redundancy elements obtained from the N information elements, then a complex symbol obtained from an information element of the first sub-set of coded elements E1 can be mapped to a position weakly impacted by the interferences while a complex symbol obtained from a redundancy element of the second sub-set of coded elements E2 can be mapped to a position more strongly impacted by interferences. Conversely, a complex symbol obtained from an information element of the first sub-set of coded elements E1 can be mapped to a position highly impacted by interferences if a complex symbol obtained from a redundancy element of the second sub-set of coded elements E2 can be mapped to a position more weakly impacted by the interferences.

It is thus proposed, according to this technique, to optimize the time-frequency mapping step.

Here below, we describe an example of application of this technique of optimizing time-frequency mapping for an FTN/OQAM type modulation and a systematic coding of the N information bits.

As indicated with reference to the prior art, FTN transmission reduces the transmission time for a given volume of information for multicarrier transmission systems but, as a trade-off, it generates high interference. In particular, if the systematic and redundancy (parity) bits of a same code word are mapped to the positions most impacted by interference, the decision of the decoder on this code word at reception will be the wrong decision.

It is thus proposed according to this example to control/optimize the step of time-frequency mapping of the symbols in order to ensure that if a redundancy bit is mapped to a position highly impacted by interference, then the corresponding systematic bit (from which the redundancy bit is determined) will be mapped to a position weakly affected by the interference and vice versa.

To this end, it may be recalled that the signal output from the FTN/OQAM modulator is written as follows:

$$s[k] = \sum_{n=0}^{\infty} g[k-nN_f] * \sum_{m=0}^{M-1} a_{m,n} e^{j\Phi_{m,n}} e^{j2\pi m\left(nN_f - \frac{D}{2}\right)} e^{\frac{j2\pi m(k-nN_f)}{M}}$$

with:
g being the waveform used;
M the number of carriers;

$$N_f = \left[\tau \cdot \frac{M}{2}\right]_{rounded},$$

with τ the compression factor;
L the length of the prototype filter g;
D=L−1 a delay parameter introduced to make the system a causal system;
$a_{m,n}$ the symbols to be transmitted, with real values for a OQAM modulation;
$\phi_{m,n}$ a phase term of the FTN/OQAM modulation which can be equal to $$\Phi_{m,n} = \frac{\pi}{2}(m+n)$$

It can be noted that the interference introduced by the FTN transmission depends on the time instant n and is periodic. Its period depends on the compression factor τ (or $N_f$ for the discrete signal). $N_\tau$ denotes the period corresponding to a compression factor τ. Thus, if $N_{mp}$ denotes a number of multicarrier symbols in a block, we have:

$$N_{mp} = a * N_\tau (\alpha \in \mathbb{N}).$$

In particular, we have:

$$N_\tau = \left\{ \begin{array}{l} \frac{M}{2N_f} \text{ if } \mod(M, 2N_f) = 0 \\ \frac{M}{\gcd(M, 2N_f)} \text{ if } \mod(M, 2N_f) \neq 0 \end{array} \right\}$$

For a given frequency m, $m \in \{1, \ldots, M\}$, the power of the interference that impacts on the first $N_\tau$ positions in the time-frequency space is computed.

It is thus possible, according to this technique, to classify these $N_\tau$ positions in a rising order of this power of interference, to choose that position of the time-frequency space to which a complex symbol can be mapped.

$n_1 < \ldots < n_{N_\tau}$ such that $P_{n_1} < \ldots < P_{N_\tau}$.

with $P_{n_i}$: the power of interference at a position $n_i$ among the $N_\tau$ positions in time.

It can be noted that, in the case of FTN, the interference does not depend on the frequency position. The computation and the classification of the power of the interference can therefore be implemented once for $N_\tau$ positions, and the result found can be applied directly for the other positions in time (of the same carrier) and the other carriers.

If not, we proceed similarly for the $N_\tau$ positions in time in the time-frequency space for the frequency m, and for the other frequencies.

Returning to FIG. 3, and according to this example, at the end of the coding step 31, a first sub-set of coded elements, or block E1, comprising the systematic bits, is obtained and a second sub-set of coded elements, or block E2, comprising the parity (redundancy) bits, is obtained. For example, a coding efficiency equal to ½ is considered. The blocks E1 and E2 therefore have identical size.

Each block can be interleaved separately (331, 332). In particular, the interleaving functions implemented for the interleaving of the block E1 (331) and the block E2 (332) can be identical or distinct. These are for example instances of random interleaving.

During the binary/q-ary mapping step 341, a block $E_1'$ of QAM symbols is built out of the block $E_1$ of systematic bits using, for example, the Gray mapping technique.

During the binary/m-ary mapping step 342, a block $E_2'$ of QAM symbols is built out of the block $E_2$ of parity bits, using for example the Gray mapping technique.

During the time-frequency mapping step 351, the block E; of QAM symbols built out of the block $E_1$ of systematic bits is mapped to the $$\frac{N_\tau}{2}$$

first positions among the positions $n_i < \ldots < n_{j_1}$, that correspond to the positions weakly impacted by interference. I designates the set of these positions.

During the time-frequency mapping step 352, the block $E_2'$ of QAM symbols built out of the block $E_2$ of parity bits is mapped to the $$\frac{N_\tau}{2}$$

last positions among the positions $n_i < \ldots < n_{j_1}$ that correspond to the positions highly impacted by the interference. J designates the set of these positions.

For example, if we consider a compression factor $\tau=0.8$, the period of the interferences is $N_\tau=16$.

For each carrier, the order of the 16 positions in time according to the power of interference is such that:

| $n_1$ | $n_6$ | $n_{12}$ | $n_{11}$ | $n_7$ | $n_{16}$ | $n_2$ | $n_5$ | $n_{13}$ | $n_{10}$ | $n_8$ | $n_{15}$ | $n_3$ | $n_4$ | $n_{14}$ | $n_9$ |
|---|---|---|---|---|---|---|---|---|---|---|---|---|---|---|---|

The QAM symbols built out of the systematic bits are mapped to the positions of the set I, defined by: $I=\{n_1, n_6, n_{12}, n_{11}, n_7, n_{16}, n_2, n_6\}$, corresponding to the positions least affected by interference.

The QAM symbols built out of the parity bits are mapped to the positions of the set J defined by: $J=\{n_9, n_{14}, n_4, n_3, n_{15}, n_8, n_{10}, n_{13}\}$, corresponding to the positions most affected by interference.

In particular, if we consider a systematic code and an overall efficiency r=½, then if the QAM symbol generated from an information bit is mapped to the position $n_1$ having the weakest power of interference, the QAM symbol generated from the parity bit corresponding to this information bit can already be mapped to the position $n_9$ with the strongest power of interference. If the QAM symbol generated from an information bit is mapped to the position $n_6$ having the second weakest power of interference, the QAM symbol generated from the parity bit corresponding to this information bit can be mapped to a position $n_{14}$ having the second strongest power of interference, etc.

If we consider a systematic code and an overall efficiency r=⅓, the systematic bits can be placed on the ⅓ positions least affected by interference and the redundancy bits can be placed on the ⅔ positions most affected by the interference.

For a non-systematic code, it is possible to apply a similar process. For example, if a non-systematic code and an overall efficiency r=½ are considered, it is possible to implement a separation of the redundancy bits to distribute the two redundancy bits obtained from the same information bit into two distinct groups. Each group is then processed separately: the bits of the first group (and of the second group respectively) are interleaved and complex symbols are built out of the interleaved bits of the first group (and the second group respectively). The complex symbols obtained from the interleaved bits of the first group are then mapped to the positions least affected by the interference and the complex symbols obtained from the interleaved bits of the second group are mapped to the positions most affected by interference.

The same procedure is carried out for the other positions of the carrier m, and for the other carriers (i.e. the other frequencies).

We thus obtain, at the end of these steps, a multicarrier signal to be transmitted.

FIG. 4 illustrates the implementation of such a technique for optimizing the time-frequency mapping, combined with the precoding of the complex symbols.

More specifically, according to FIG. 4, a coding step 41 is applied to a set of information elements, for example sized N, delivering a set of coded elements, for example sized B. The coded elements are then separated (42) into sub-sets.

If the code implemented during the coding step 41 is systematic, then a first sub-set of coded elements comprising the systematic bits and a second sub-set of coded elements comprising the parity bits are considered.

The systematic bits of the first sub-set of coded elements can be distributed into two sub-group denoted as $S_1$ and $S_2$. For example, each sub-group comprises half of the systematic bits.

The parity bits of the second sub-set of coded elements can be distributed into two sub-groups, denoted $P_1$ and $P_2$. For example, the first sub-group of parity bits $P_1$ comprises the parity bits obtained from the first sub-group of information bits $S_1$ and the second sub-group of parity bits $P_2$ comprises the parity bits obtained from the second sub-group of information bits $S_2$.

Each sub-group is then processed separately. For each sub-group, the coded elements composing it can be interleaved during an optional interleaving step (431, 432, 433, 434), and then converted into at least one complex symbol during a mapping step (441, 442, 443, 444). The complex symbol or symbols thus obtained are then mapped onto the carriers of the multicarrier signal during a time-frequency mapping step (451, 452, 453, 454). As already indicated, the interleaving functions implemented for the interleaving of the different sub-groups can be identical or distinct. These are for example instances of random interleaving.

During a precoding step 46, a part (first sub-set) of the complex symbols intended to be mapped onto the carriers of the multicarrier signal is precoded. This precoding step 46 modifies the value of a complex symbol of the first sub-set to take account of an interference generated by at least one other complex symbol intended to be transmitted at the same instant or at a same frequency according to a predetermined pattern of time-frequency transmission.

The modulation step 47 then modulates the carriers of the multicarrier symbol or symbols either by a precoded complex symbol or by a non-precoded complex symbol according to the predetermined transmission pattern.

For example, it is desired that half of the complex symbols to be transmitted should be precoded and the other half should be non-precoded. The coded elements used to build the complex symbols that are to be precoded during the precoding step 46 belong for example to the first sub-set of coded elements (comprising the first sub-group of information bits $S_1$ and the first sub-group of parity bits $P_1$), and the coded elements used to build the complex symbols not to be precoded during the precoded step 46 belong to the second sub-set of coded elements (comprising the second sub-group of information bits $S_2$ and the second sub-group of parity bits $P_2$) with, according to this example, $S_1=S_2=N/2$.

As indicated here above, taking the context of an FTN-OQAM type transmission, the interference introduced by the FTN transmission depends on the time n and is periodic according to a period $N_\tau$. On a carrier, the power of interference for the $N_\tau$ associated temporal positions is computed.

Thus, with $N_{mp}$ denoting the number of multicarrier symbols to be transmitted in a block, we have $N_{mp}=a*N_\tau$ ($a \in \mathbb{N}$).

Since it is sought to precode half of the symbols to be transmitted, it is considered that among these $N_\tau$ temporal positions, $$N_{\tau 1} = \frac{N_\tau}{2}$$

are allocated to precoded symbols and the remainder of the positions, namely $$N_{\tau 2} = \frac{N_\tau}{2}$$

positions, are allocated to non-precoded symbols.

As explained with reference to FIG. 3, for a given frequency m, the power of the interference that impacts on the first $N_{\tau 1}$ positions in time in the time-frequency space is computed. It is thus possible, according to this technique, to classify the $N_{\tau 1}$ positions in a rising order of power of interference, to choose that position of the time-frequency space to which it is possible to map a complex symbol intended to be precoded:

$$n_1 < \ldots < n_{N_{\tau 1}} \text{ such that } P_{n_1} < \ldots < P_{n_{N_{\tau 1}}}.$$

with $P_{n_i}$: the power of interference at a position $n_i$ among the $N_{\tau 1}$ positions in time.

During the time-frequency mapping step 451, the block of QAM symbols built out of the first sub-group of systematic bits is mapped to the $$\frac{N_{\tau 1}}{2}$$

first positions among the positions $n_1 < \ldots < n_{N_{\tau 1}}$, which correspond to the positions weakly impacted by the interference. $I_1$ denotes the set of these positions.

During the time-frequency mapping step 452, the block of QAM symbols built out of the first sub-group of parity bits is mapped to the $$\frac{N_{\tau 1}}{2}$$

last positions among the positions $n_1 < \ldots < n_{N_{\tau 1}}$, that correspond to the positions strongly impacted by interference. $J_1$ denotes the set of these positions.

Similarly, the power of the interference that impacts on the $N_{\tau 2}$ first positions in time in the time-frequency space is computed. These $N_{\tau 2}$ positions can thus be classified according to a rising order of this power of interference to choose that position of the time-frequency space to which it is possible to map a complex symbol intended to be non-precoded.

The set $I_2$ contains the first $$\frac{N_{\tau 2}}{2}$$

positions that are the least impacted by the interferences. The set $J_2$ contains the last $$\frac{N_{\tau2}}{2}$$

positions that are the most impacted by the interferences.

The following are considered for example:
- a compression factor τ=0.8, hence one period of the interferences $N_\tau$=16;
- that the precoded step 46 implements an SIPC precoding in time and a transmission pattern corresponding to an alternation in time of two precoded symbols, and two non-precoded symbols, and an alternation in frequency of one precoded symbol and one non-precoded symbol to reduce the inter-symbol interference, and that it is sought to precode the complex symbols at the positions ((m,n)) such that:
  - m is an even parity value and n=1, 2 mod 4 and
  - m is an odd parity value and n=3, 4 mod 4

In the time-frequency space, the positions of the precoded symbols are therefore:

$N_{\tau_1}$={(m even,n=1,2,5,6,9,10,13,14) and (m odd,n=3, 4,7,8,11,12,15,16)} and the positions of the non-precoded symbols are:

$N_{\tau_2}$={(m even,n=3,4,7,8,11,12,15,16) and (m odd, n=1,2,5,6,9,10,13,14)}

The rising order of the 16 positions according to the power of interference is, as in the example described with reference to FIG. 3, for an FTN-OQAM transmission without precoding:

| $n_1$ | $n_6$ | $n_{12}$ | $n_{11}$ | $n_7$ | $n_{16}$ | $n_2$ | $n_5$ | $n_{13}$ | $n_{10}$ | $n_8$ | $n_{15}$ | $n_3$ | $n_4$ | $n_{14}$ | $n_9$ |
|---|---|---|---|---|---|---|---|---|---|---|---|---|---|---|---|

According to this example, the QAM symbols built out of the first sub-group of information bits $S_1$, intended to be precoded, are mapped to the positions of the set $I_1$, defined by:

$I_1$={(m even,n=1),(m even,n=6),(m odd,n=12),(m odd,n=11),(m odd,n=7),(m odd,n=16),(m even, n=2),(m even,n=5)}

The QAM symbols built out of the first sub-group of parity bits $P_1$, intended to be precoded are mapped to the positions of the set $J_1$, defined by:

$J_1$={(m even,n=9),(m even,n=14),(m odd,n=4),(m odd,n=3),(m odd,n=15),(m odd,n=8),(m even, n=10),(m even,n=13)}

The QAM symbols built out of the second sub-group of information bits $S_2$, not intended to be precoded are mapped to the positions of the set $I_2$, defined by:

$I_2$={(m odd,n=1),(m odd,n=6),(m even,n=12),(m even,n=11),(m even,n=7),(m even,n=16),(m odd,n=2),(m odd,n=5)}

The QAM symbols built out of the second sub-group of parity bits $P_2$, not intended to be precoded, are mapped to the positions of the set $J_2$, defined by:

$J_2$={(m odd,n=9),(m odd,n=14),(m even,n=4),(m even,n=3),(m even,n=15),(m even,n=8),(m odd, n=10),(m odd,n=13)}

In particular, if the QAM symbol generated from an information bit of the sub-group $S_1$ is mapped to the position $n_1$ having the lowest power of interference, the QAM symbol generated from the parity bit of the sub-group $P_1$ corresponding to this information bit can be mapped to the position $n_9$ having the highest power of interference. If the symbol QAM generated from an information bit of the sub-group $S_1$ is mapped to the position $n_6$ having the second lowest power of interference, the QAM symbol generated from the parity bit of the sub-group $P_1$ corresponding to this information bit can be mapped to the position $n_{14}$ having the second highest power of interference, etc.

The same procedure is carried out for the other positions of the carrier m, and for the other carriers (i.e. the other frequencies).

At the end of these steps, at least one block of multicarrier symbols to be transmitted is obtained, this block comprising $N_{mp}$ multicarrier symbols with:

$N_{mp}$=a*$N_\tau$(a∈ℕ) and $N_{mp}$=2*N/(r*M*$\log_2(\text{mod}_{ord})$)

N denoting the number of information elements at input of the coding step, M the number of carrier frequencies to be modulated, r the overall coding efficiency and $\text{mod}_{ord}$ the modulation order.

Referring here below to FIG. 5, we present the technique for generating a multicarrier signal according to the invention, described with reference to FIGS. 1 and 2, combined with the technique used to optimize the time-frequency mapping described with reference to FIGS. 3 and 4.

If necessary, a step for the precoding of the complex symbols can also be implemented before the modulation step.

According to this FIG. 5, for the generation of at least one block of multicarrier symbols, such a method implements a step for coding 51 a set of information elements, for example sized N, delivering a set of coded elements, for example sized B'. The efficiency r' of the coding step 51 is such that B'=N/r'.

The coded elements are separated into two sub-sets, including a first sub-set sized $B_1$ and a second sub-set sized $B_2$, with $B_1+B_2$=B'.

Each sub-set of coded elements is processed separately.

As described with reference to FIG. 1, it is proposed to apply a different efficiency value to certain information elements so as to increase or reduce the level of protection of these information elements obtained through the coding. Thus, it is sought to apply a efficiency $r_1$ to a first sub-set of information elements sized $N_1$, so as to obtain a first sub-set of punctured coded elements sized $B'_1$, and to apply a efficiency $r_2$ to a second sub-set of information elements sized $N_2$, so as to obtain a second sub-set of punctured coded elements sized $B'_2$, with $N_1+N_2$=N and B=+$B'_1+B'_2$.

More specifically, the first sub-set of coded elements is punctured during a puncturing step 521. We thus obtain a first sub-set of $B'_1$ punctured coded elements according to a first puncturing pattern. The coding efficiency associated with the coding step 51 and puncturing step 521 is such that $B'_1=N_1/r_1$. The $B'_1$ punctured coded elements of the first sub-set can then be interleaved during an optional interleaving step 531, for example by using a first random interleaving function then converted into at least one complex symbol during a mapping step 541. The complex symbol or symbols thus obtained are then mapped onto the carriers of the multicarrier symbol during a time-frequency mapping step 551 specified here below.

Similarly, the second sub-set of coded elements is punctured during a puncturing step 522. We thus obtain a second sub-set of $B'_2$ punctured coded elements according to a second puncturing pattern. The coding efficiency associated with the coding step 51 and puncturing step 522 is such that $B'_2 = N_2/r_2$. The $B'_2$ punctured coded elements of the second sub-set can then be interleaved during an optional interleaving step 532, for example by using a second random interleaving function, and then converted into at least one complex symbol during a mapping step 542. It can be noted that the first and second interleaving functions can be different. The complex symbol or symbols thus obtained are then mapped onto the carriers of the multicarrier signal during a time-frequency mapping step 552 specified here below.

In particular, the time-frequency mapping steps 551 and 552 make it possible to choose the position of the carrier that is "mapped" with a complex symbol. It is thus possible to allocate carriers subjected to a first type of interference (for example interference below a predetermined threshold) to the complex symbols obtained from the $B'_1$ punctured coded elements of the first sub-set and to allocate carriers subjected to a second type of interference (for example interference above or equal to a predetermined threshold) to the complex symbols obtained from the $B'_2$ punctured coded elements of the second sub-set.

During a step of modulation 56, the multicarrier symbol of symbols thus built are transmitted.

If necessary, a step of precoding of the complex symbols can be implemented before the modulation step 56, for example according to the SIPC precoding technique as presented in the document "Sparse Interference Pre-Cancellation" for FTN-OQAM Systems (Naila Lahbabi et al.) mentioned here above.

More specifically, referring to FIG. 6, we present the steps of interleaving 531, 532, mapping onto complex symbols 541, 542, and time-frequency mapping 551, 552 of FIG. 5.

The steps of coding 61, puncturing 621 of the first sub-set of coded elements and puncturing 622 of the second sub-set of coded elements are similar to the steps of coding 51, puncturing 521 of the first sub-set of coded elements and puncturing 522 of the second sub-set of coded elements and are not described in greater detail.

It is considered for example that the efficiency $r_1$ associated with the coding step 61 and puncturing step 621 of the first sub-set of coded elements is smaller than the efficiency $r_2$ associated with the step for coding 61 and puncturing 622 of the second sub-set of coded elements: $r_1 \leq r \leq r_2$.

The coded elements are separated into two sub-sets, among them a first sub-set sized $B_1$ and a second sub-set sized $B_2$, with $B_1 + B_2 = B'$. For example, the code implemented during the coding step 61 is systematic and each sub-set of coded elements comprises information bits and parity bits associated with these information bits.

Each sub-set of coded elements is processed separately.

At the end of the step for puncturing 621 the first sub-set of coded elements, the first sub-set of $B'_1$ punctured coded elements is obtained. The $B'_1$ punctured coded elements can be grouped together into sub-groups:
  a first sub-group of information bits $S_1$ comprising the systematic bits of the first sub-set of $B'_1$ punctured coded elements,
  a first sub-group of parity bits $P_1$ comprising the parity bits obtained from the first sub-group of information bits $S_1$,
  an additional sub-group of parity bits $P'_1$ comprising additional parity bits since it has been assumed that: $r_1 \leq r$.

At the end of the puncturing step 622 of the second sub-set of coded elements, the second sub-set of $B'_2$ punctured coded elements is obtained. The $B'_2$ punctured coded elements can be grouped into sub-groups:
  a second sub-group of information bits $S_2$ comprising the systematic bits of the second sub-set of $B'_2$ punctured coded elements,
  a second sub-group of parity bits $P_2$ comprising the parity bits obtained from the second sub-group of information bits $S_2$,
  a sub-group of information bits $S'_2$ comprising the systematic bits of the second sub-set of $B'_2$ punctured coded elements the least protected (i.e. those that have fewer parity bits than the others, since it is assumed that: $r \leq r_2$).

It is noted that $S_1 + S_2 + S'_2 = N$

Each sub-group is then processed separately. For each sub-group, the coded elements composing it can be interleaved during an optional interleaving step (631, 632, 633, 634, 635, 636), then converted into at least one complex symbol during a mapping step (641, 642, 643, 644, 645, 646). The complex symbol or symbols thus obtained are then mapped onto the carriers of the multicarrier signal during a time-frequency mapping step (651, 652, 653, 654, 655, 656). As already indicated, the interleaving functions implemented for interleaving the different sub-groups can be identical or distinct. The interleavings are, for example, random interleavings.

As indicated here above, if we take the context of a FTN-OQAM type transmission, the interference introduced by the FTN transmission depends on the time n and is periodic, according to a period $N_\tau$. On a carrier, the power of interferences for the $N_\tau$ associated temporal positions is computed and the associated positions are classified in a rising order of this power of interference to choose that position of the time-frequency space to which a complex symbol can be mapped.

More specifically, the complex symbols built out of the first sub-group of information bits $S_1$ are mapped to the positions of the set $I_1$, sized $L_1$, corresponding for example to the $L_1$ positions least affected by interference.

The complex symbols built out of the first sub-group of parity bits $P_1$ are mapped to the positions of the set $J_1$, sized $L_1$, corresponding to the $L_1$ following positions.

The complex symbols built out of the additional sub-group of parity bits $P'_1$ are mapped to the positions of the set $J'_1$, sized $L_2$, corresponding to the $L_2$ remaining positions most affected by the interference.

It is noted that $L_1 + L_1 + L_2 = N_\tau$.

Similarly, the complex symbols built out of the sub-group of information bits $S'_2$ are mapped to the positions of the set $I'_1$, sized $L_2$, corresponding for example to the $L_2$ positions least impacted by the interference.

The complex symbols built out of the second sub-group of information bits $S_2$ are mapped to the positions of the set $I_2$, sized $L_1$, corresponding to the $L_1$ following positions.

The complex symbols built out of the second sub-group of parity bits $P_2$ are mapped to the positions of the set $J_2$, sized $L_1$, corresponding to the $L_1$ positions most affected by the interference.

Again, it is noted that $L_1 + L_1 + L_2 = N_\tau$.

During a modulation step 67, the multicarrier symbol or symbols thus built are transmitted.

If necessary, a step for precoding 66 the complex symbols can be implemented before the step of modulation 67, for example according to the SIPC precoding technique as presented in the documentary "Sparse Interference Pre-Cancellation for FTN-OQAM Systems (Naila Lahbabi et al.) mentioned here above.

Here below, we give examples of positions defined by the sets $I_1$, $I_2$, $I'_1$, $J_1$, $J_2$, $J'_1$, according to the compression factor and the precoding considered.

It is considered, according to a first example, that the precoding step 66 implements an SIPC precoding in frequency according which it is sought to cancel or at least to reduce only the inter-carrier interference ($ICI_n$), in precoding a first sub-set of OQAM symbols. We also consider:
- a compression factor $\tau=0.8$, hence a period of the interferences $N_\tau=16$;
- that the transmission pattern corresponds, in time, either to a sequence of precoded symbols or to a sequence of non-precoded symbols, and, in frequency, to an alternation of one precoded symbol and one non-precoded symbol.

For a given frequency m, for example m as an even value corresponding to the transmission of precoded symbols, the power of the interference that impacts on the first $N_\tau$ positions in time in the time-frequency space is computed, and these $N_\tau$ positions are classified according to a rising order of power of interference:

$$n_1 < \ldots < n_{N_\tau} \text{ such that } P_{n_1} < \ldots < P_{n_{N_\tau}}.$$

with $P_{n_i}$: the power of interference at a position $n_i$ among the $N_\tau$ positions in time.

Going from the positions least impacted by the interference towards the positions most impacted by the interference, the set $I_1$ contains the $L_1$ first positions, the set $J_1$ contains the $L_1$ positions that follow and the set $J'_1$ contains the $L_2$ positions that follow.

The same procedure is carried out for a given frequency m+1, corresponding to the transmission of the non-precoded symbols.

Going from the positions least impacted by the interference towards the positions most impacted by the interference the set $I'_2$ contains the $L_2$ first positions, the let $I_2$ contains the $L_1$ positions that follow, and the set $J_2$ contains the $L_1$ remaining positions.

Returning to the example of FIG. 2, with code efficiency values $r_1=8/17$ and $r_2=9/17$, the following are obtained: $L_1=7$ and $L_2=2$.

The rising order of the 16 positions according to the power of interference is, as in the example described with reference to FIG. 3:

| $n_1$ | $n_6$ | $n_{12}$ | $n_{11}$ | $n_7$ | $n_{16}$ | $n_2$ | $n_5$ | $n_{13}$ | $n_{10}$ | $n_8$ | $n_{15}$ | $n_3$ | $n_4$ | $n_{14}$ | $n_9$ |
|---|---|---|---|---|---|---|---|---|---|---|---|---|---|---|---|

In the time-frequency space, the positions of the precoded symbols are:

$N_\tau = \{(m \text{ even}, n=1,2,3,4,5,6,7,8,9,10,11,12,13,14)$ and the positions of the non-precoded symbols are:

$N_\tau = \{(m \text{ odd}, n=1,2,3,4,5,6,7,8,9,10,11,12,13,14)$

The following sets are obtained:
for m as an even parity value:

$I_1 = \{n=1,6,12,11,7,16,2\}$ $J_1 = \{n=4,3,15,8,10,13,5\}$ $J'_1 = \{n=9,14\}$ for m as an odd parity value:

$I'_2 = \{n=1,6\}$ $I_2 = \{=12,11,7,16,2,5,13\}$ $J_2 = \{n=9,14,4,3,15,8,10\}$

As already indicated, the same procedure is followed for the other positions of the carrier m, and for the other carriers (i.e. the other frequencies).

According to a second example, it is considered that the precoding step 66 implements an SIPC precoding in time, according to which it is sought to cancel or at least to reduce only the inter-symbol interferences ICI, in precoding a first sub-set of OQAM symbols. It is also considered that:
- a compression factor $\tau=0.8$, hence one period of the interferences $N_\tau=16$;
- that the transmission pattern corresponds to an alternation in time of two precoded symbols and two non-precoded symbols and an alternation, in frequency, of one precoded symbol and one non-precoded symbol to reduce the inter-symbol interference.

On a carrier, i.e. for a given frequency m, the power of interferences for the $N_\tau$ associated temporal positions is computed.

Since it is sought to precode half of the symbols to be transmitted, it is considered that among the $N_\tau$ temporal positions, $$N_{\tau 1} = \frac{N_\tau}{2}$$

are allocated to precoded symbols, and the rest of the positions, namely $$N_{\tau 2} = \frac{N_\tau}{2}$$

positions are allocated to non-precoded symbols.

The $N_{\tau 1}$ positions are classified according to a rising order of the interference power.

Going from the positions least impacted by the interference towards the positions most impacted by the interference, the set $I_1$ contains the $L_1$ first positions, the set $J_1$ contains the $L_1$ positions that follow and the set $J'_1$ contains the $L_2$ positions that follow.

In the same way, the $N_{\tau 2}$ positions are classified according to a rising order of the power of interference.

Going from the positions least impacted by the interference towards the positions most impacted by the interference the set I'$_2$ contains the L$_2$ first positions, the set I$_2$ contains the L$_1$ positions that follow, and the set J$_2$ contains the L$_1$ remaining positions.

Returning to the example of FIG. 2, with code efficiency values r$_1$=8/17 and r$_2$=9/17, the following are obtained: L$_1$=7 and L$_2$=2.

The rising order of the 16 positions according to the power of interference is, as in the example described with reference to FIG. 3:

| n$_1$ | n$_6$ | n$_{12}$ | n$_{11}$ | n$_7$ | n$_{16}$ | n$_2$ | n$_5$ | n$_{13}$ | n$_{10}$ | n$_8$ | n$_{15}$ | n$_3$ | n$_4$ | n$_{14}$ | n$_9$ |
|---|---|---|---|---|---|---|---|---|---|---|---|---|---|---|---|

In the time-frequency space, the positions of the precoded symbols are:

$N_{\tau_1}$={(m even,n=1,2,5,6,9,10,13,14) et (m odd,n=3,4,7,8,11,12,15,16)

and the positions of the non-precoded symbols are:

$N_{\tau_2}$={(m even,n=3,4,7,8,11,12,15,16) et (m odd,n=1,2,5,6,9,10,13,14)}

The following sets are obtained:

I$_1$={(m even,n=1),(m even,n=6),(m odd,n=12),(m odd,n=11),(m odd,n=7),(m odd,n=16),(m even, n=2)}

J$_1$={(m odd,n=4),(m odd,n=3),(m odd,n=15),(m odd, n=8),(m even,n=10),(m even,n=13),(m even, n=5)}

J'$_1$={(m even,n=9),(m even,n=14)}

I'$_2$={(m odd,n=1),(m odd,n=6)}

I$_2$={(m even,n=12),(m even,n=11),(m even,n=7),(m even,n=16),(m odd,n=2),(m odd,n=5),(m odd, n=13)}

J$_2$={(m odd,n=9),(m odd,n=14),(m even,n=4),(m even,n=3),(m even,n=15),(m even,n=8),(m odd, n=10)}

Referring finally to FIG. 7, we present the simplified structure of a device implementing a technique for generating a multicarrier signal according to one embodiment of the invention.

Such a device for generating a multicarrier signal, or transmitter, comprises a memory 71 comprising a buffer memory, a processing unit 72 equipped for example with one or more processors P, and controlled by an application or a computer program 73, implementing the steps of the method of generation according to one embodiment of the invention.

At initialization, the code instructions of the computer program 73 are for example loaded into a RAM and then executed by the processor of the processing unit 72. The processing unit 72 inputs a set of information elements (N). The microprocessor of the processing unit 72 implements the steps of the method of generation described here above according to the instructions of the computer program 73 to generate at least one block of multicarrier symbols.

The invention claimed is:

1. A method for generating a multicarrier signal formed by a temporal succession of multicarrier symbols, wherein the method comprises the following steps performed by a device for generating at least one block of multicarrier symbols:

coding a set of information elements delivering a set of coded elements, puncturing a first sub-set of coded elements of the set of coded elements, according to a first puncturing pattern, delivering a first sub-set of punctured coded elements, puncturing a second sub-set of coded elements of said set of coded elements, complementary to said first sub-set, according to a second puncturing pattern, delivering a second sub-set of punctured coded elements, mapping the punctured coded elements of said first and second sub-sets of punctured coded elements onto at least one complex symbol, and generating said block of multicarrier symbols from said at least one complex symbol wherein generating said block of multicarrier symbols comprises, for at least one carrier of said block of multicarrier symbols:

determining a power of interference affecting said carrier on $N_\tau$ consecutive positions in time;

classifying the $N_\tau$ positions according to said power of interference;

time-frequency mapping of the complex symbols built out of information elements of said first sub-set of punctured coded elements to the positions associated with a power of interference smaller than or equal to a pre-determined threshold, and complex symbols built out of redundancy elements of said first sub-set of punctured coded elements, obtained from said information elements, to the positions associated with a power of interference greater than the pre-determined threshold, and time-frequency mapping of the complex symbols built out of the information elements of said second sub-set of punctured coded elements to the positions associated with a power of interference smaller than or equal to a pre-determined threshold and complex symbols built out of redundancy elements of said second sub-set of punctured coded elements, obtained from said information elements, to the positions associated with a power of interference greater than said pre-determined threshold.

2. The method of claim 1, wherein a coding efficiency associated with said coding and puncturing steps of said first sub-set of coded elements is different from a coding efficiency associated with said coding and puncturing steps of said second sub-sets of coded elements.

3. The method of claim 1, wherein said multicarrier symbols are transmitted at a faster-than-Nyquist rate.

4. The method of claim 1, wherein the method comprises precoding a first sub-set of complex symbols, delivering a first sub-set of precoded complex symbols, said precoding modifying a value of a complex symbol of said first sub-set of complex symbols to take account of an interference generated by at least one other complex symbol for transmission at the same instant or at a same frequency according to a pre-determined time-frequency transmission pattern.

5. The method of claim 4, wherein said first sub-set of complex symbols is generated from the punctured coded elements of said first sub-set of coded elements, and said second sub-set of complex symbols is generated from the punctured coded elements of said second sub-set of coded elements.

6. The method of claim 1, wherein the method further comprises a first step of interleaving of the punctured coded elements of said first sub-set of punctured coded elements and a second step of interleaving of the punctured coded elements of said second sub-set of punctured coded elements implemented prior to the mapping step.

7. The method of claim 6, wherein said first step of interleaving implements at least one first interleaving pattern for the interleaving of the information elements of said first sub-set of punctured coded elements and a second interleaving pattern for the interleaving of redundancy elements of said first sub-set of punctured coded elements, obtained from said information elements, and said second step of interleaving implements at least one first interleaving pattern for the interleaving of the information elements of said second sub-set of punctured coded elements and a second interleaving pattern for the interleaving of redundancy elements of said second sub-set of punctured coded elements, obtained from said information elements.

8. The method of claim 1, wherein said generating said block of multicarrier symbols takes account of at least one interference affecting at least one carrier of said multicarrier signal.

9. The method of claim 1, wherein the number of positions $N_\tau$ depends on the compression factor r defined for faster-than-Nyquist transmission.

10. A device for generating a multicarrier signal, formed by a temporal succession of multicarrier symbols, wherein the device comprises:
   a processor; and
   a non-transitory computer-readable medium comprising instructions stored thereon, which when executed by the processor configure the device to perform acts comprising:
   coding a set of information elements delivering a set of coded elements,
   puncturing a first sub-set of coded elements of said set of coded elements according to a first puncturing pattern, delivering a first sub-set of punctured coded elements,
   puncturing a second sub-set of coded elements of said set of coded elements, complementary to said first sub-set, according to a second puncturing pattern, delivering a second sub-set of punctured coded elements,
   mapping the punctured coded elements of said first and second sub-set of punctured coded elements onto at least one complex symbol, and
   generating a block of multicarrier symbols from said at least one complex symbol;
   wherein generating said block of multicarrier symbols comprises, for at least one carrier of said block of multicarrier symbols:
   determining a power of interference affecting said carrier on $N_\tau$ consecutive positions in time;
   classifying the $N_\tau$ positions according to said power of interference;
   time-frequency mapping of the complex symbols built out of information elements of said first sub-set of punctured coded elements to the positions associated with a power of interference smaller than or equal to a pre-determined threshold, and complex symbols built out of redundancy elements of said first sub-set of punctured coded elements, obtained from said information elements, to the positions associated with a power of interference greater than the pre-determined threshold, and
   time-frequency mapping of the complex symbols built out of the information elements of said second sub-set of punctured coded elements to the positions associated with a power of interference smaller than or equal to a pre-determined threshold and complex symbols built out of redundancy elements of said second sub-set of punctured coded elements, obtained from said information elements, to the positions associated with a power of interference greater than said pre-determined threshold.

11. A non-transitory computer-readable medium comprising a computer program comprising instructions for implementing a method for generating a multicarrier signal formed by a temporal succession of multicarrier symbols, when this program is executed by a processor of a device, wherein the instructions configure the device to:
   coding a set of information elements delivering a set of coded elements,
   puncturing a first sub-set of coded elements of the set of coded elements, according to a first puncturing pattern, delivering a first sub-set of punctured coded elements,
   puncturing a second sub-set of coded elements of said set of coded elements, complementary to said first sub-set, according to a second puncturing pattern, delivering a second sub-set of punctured coded elements,
   mapping the punctured coded elements of said first and second sub-sets of punctured coded elements onto at least one complex symbol, and
   generating a block of multicarrier symbols from said at least one complex symbol,
   wherein generating said block of multicarrier symbols comprises for at least one carrier of said block of multicarrier symbols:
   determining a power of interference affecting said carrier on $N_\tau$ consecutive positions in time;
   classifying the $N_\tau$ positions according to said power of interference;
   time-frequency mapping of the complex symbols built out of information elements of said first sub-set of punctured coded elements to the positions associated with a power of interference smaller than or equal to a pre-determined threshold, and complex symbols built out of redundancy elements of said first sub-set of punctured coded elements, obtained from said information elements, to the positions associated with a power of interference greater than the pre-determined threshold, and
   time-frequency mapping of the complex symbols built out of the information elements of said second sub-set of punctured coded elements to the positions associated with a power of interference smaller than or equal to a pre-determined threshold and complex symbols built out of redundancy elements of said second sub-set of punctured coded elements, obtained from said information elements, to the positions associated with a power of interference greater than said pre-determined threshold.

12. A method for generating a multicarrier signal formed by a temporal succession of multicarrier symbols, wherein the method comprises the following steps performed by a device for generating at least one block of multicarrier symbols:
   coding a set of information elements delivering a set of coded elements,
   puncturing a first sub-set of coded elements of the set of coded elements, according to a first puncturing pattern, delivering a first sub-set of punctured coded elements,
   puncturing a second sub-set of coded elements of said set of coded elements, complementary to said first sub-set, according to a second puncturing pattern, delivering a second sub-set of punctured coded elements, mapping the punctured coded elements of said first and second sub-sets of punctured coded elements onto at least one complex symbol, and generating said block of multicarrier symbols from said at least one complex symbol, transmitting said multicarrier symbols at a faster-than-Nyquist rate.

13. The method of claim 12, wherein a coding efficiency associated with said coding and puncturing steps of said first sub-set of coded elements is different from a coding efficiency associated with said coding and puncturing steps of said second sub-sets of coded elements.

14. The method of claim 12, wherein the method comprises precoding a first sub-set of complex symbols, delivering a first sub-set of precoded complex symbols, said precoding modifying a value of a complex symbol of said first sub-set of complex symbols to take account of an interference generated by at least one other complex symbol for transmission at the same instant or at a same frequency according to a pre-determined time-frequency transmission pattern.

15. The method of claim 12, wherein the method further comprises a first step of interleaving of the punctured coded elements of said first sub-set of punctured coded elements and a second step of interleaving of the punctured coded elements of said second sub-set of punctured coded elements implemented prior to the mapping step.

16. The method of claim 12, wherein said generating said block of multicarrier symbols takes account of at least one interference affecting at least one carrier of said multicarrier signal.

17. A method for generating a multicarrier signal formed by a temporal succession of multicarrier symbols, wherein the method comprises the following steps performed by a device for generating at least one block of multicarrier symbols:

coding a set of information elements delivering a set of coded elements, puncturing a first sub-set of coded elements of the set of coded elements, according to a first puncturing pattern, delivering a first sub-set of punctured coded elements, puncturing a second sub-set of coded elements of said set of coded elements, complementary to said first sub-set, according to a second puncturing pattern, delivering a second sub-set of punctured coded elements, mapping the punctured coded elements of said first and second sub-sets of punctured coded elements onto at least one complex symbol, generating said block of multicarrier symbols from said at least one complex symbol, and precoding a first sub-set of complex symbols, delivering a first sub-set of precoded complex symbols, said precoding modifying a value of a complex symbol of said first sub-set of complex symbols to take account of an interference generated by at least one other complex symbol for transmission at the same instant or at a same frequency according to a pre-determined time-frequency transmission pattern.

18. The method of claim 17, wherein a coding efficiency associated with said coding and puncturing steps of said first sub-set of coded elements is different from a coding efficiency associated with said coding and puncturing steps of said second sub-sets of coded elements.

19. The method of claim 17, wherein the method further comprises a first step of interleaving of the punctured coded elements of said first sub-set of punctured coded elements and a second step of interleaving of the punctured coded elements of said second sub-set of punctured coded elements implemented prior to the mapping step.

20. The method of claim 17, wherein said generating said block of multicarrier symbols takes account of at least one interference affecting at least one carrier of said multicarrier signal.

21. The method of claim 1, further comprising the device transmitting said block of multicarrier symbols on a network.

22. The device of claim 10, further comprising a transmitter configured to transmit said block of multicarrier symbols on a network.

23. The non-transitory computer-readable medium of claim 11, wherein the instructions further configure the device to transmit said block of multicarrier symbols on a network.

24. The method of claim 17, further comprising the device transmitting said block of multicarrier symbols on a network.

* * * * *